United States Patent
Honda et al.

(10) Patent No.: US 6,829,601 B2
(45) Date of Patent: Dec. 7, 2004

(54) DOCUMENT MANAGEMENT SYSTEM

(75) Inventors: Yoshinori Honda, Yokohama (JP); Eizou Sakamoto, Ebina (JP); Junji Nakata, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 2 days.

(21) Appl. No.: 09/969,157

(22) Filed: Oct. 3, 2001

(65) Prior Publication Data

US 2002/0095418 A1 Jul. 18, 2002

(30) Foreign Application Priority Data

Oct. 4, 2000 (JP) ........................................ 2000-309297

(51) Int. Cl.$^7$ .............................................. G06F 17/30
(52) U.S. Cl. .............................. 707/4; 707/4; 707/500; 703/1; 709/219
(58) Field of Search .................... 707/500, 4; 703/1; 709/219

(56) References Cited

U.S. PATENT DOCUMENTS 6,236,987 B1 * 5/2001 Horowitz et al. .............. 707/3
2001/0037380 A1 * 11/2001 Wall et al. .................... 709/219
2002/0002563 A1 * 1/2002 Bendik ........................ 707/500
2002/0035451 A1 * 3/2002 Rothermel ..................... 703/1

FOREIGN PATENT DOCUMENTS

| JP | 3-22084 | 1/1991 |
| JP | 10-111876 | 4/1998 |
| JP | 11-39320 | 2/1999 |

\* cited by examiner

*Primary Examiner*—Charles L. Rones
(74) *Attorney, Agent, or Firm*—McDermott Will & Emery LLP

(57) ABSTRACT

A document referencing computer applying relationships or links between documents, wherein the documents are managed by a document managing computer, and the relationships or links are managed by a knowledge managing computer. The display of the links is controlled according to a variety of conditions. The display of a respective link between documents can be controlled by either a user who sets the respective link (the link setting user) or by a user using the document referencing computer to reference documents (a referencing user), thereby enabling related documents to be referenced easily.

26 Claims, 8 Drawing Sheets

| DOCUMENT ID | DOCUMENT NAME | CREATION DATE | CREATOR'S USER ID | CREATOR'S USER GROUP | KEYWORDS |
|---|---|---|---|---|---|
| DOC001 | X REPORT | 15,Apr,2000 | Tanaka | Gr1 | A,B |
| DRW001 | FIG. A | 23,Apr,2000 | Suzuki | Gr2 | C |
|  |  |  |  |  |  |

FIG. 4

USER INFORMATION

40

| USER ID | NAME | USER GROUP | ACCESS LEVEL |
|---|---|---|---|
| Tanaka | Tanaka Ichiro | Gr1 | 1 |
| Suzuki | Suzuki Jiro | Gr2 | 2 |
| Mori | Mori Saburo | Gr3 | 2 |

| EXPERTISE | USER ID |
|---|---|
| DATABASES | Tanaka |
| DATABASES | Kimura |
| NETWORKS | Mori |

FIG. 3

| LINK SOURCE DOCUMENT ID | LINK RECIPIENT DOCUMENT ID | LINK SET DATE | LINK SETTING USER ID | LINK SETTING USER'S USER GROUP |
|---|---|---|---|---|
| DOC001 | DRW002 | 5,Jun,2000 | Tanaka | Gr1 |
|  |  |  |  |  |
|  |  |  |  |  |

| JOB | OBJECTIVE | COMMENTS | ACCESS ENABLED GROUPS | ACCESSIBLE | REFERENCE FREQUENCY |
|---|---|---|---|---|---|
| CREATE REPORT | RESEARCH PRIOR ART | PICTURE OF MARKET INFORMATION | Gr1,Gr3 | 1 | 0 |
|  |  |  |  |  |  |
|  |  |  |  |  |  |

| USER ID | LINK SOURCE DOCUMENT ID |
|---------|------------------------|
| Tanaka  | DOC001                 |
|         |                        |
|         |                        |

60

DOCUMENT MANAGEMENT SYSTEM

BACKGROUND OF THE INVENTION

This invention relates to a document management system that includes a document referencing system for retrieving a desired document from a document database in which electronic documents are stored and more specifically, a technology for defining the relationship between documents and a technology for referencing related documents.

A document referencing system may be used to search for other documents related to a particular document. A conventional technology for searching for a related document employs a referencing method described following, that utilizes information on the history of past referencing operations.

The invention of JP-A-3-22084 records referenced history information consisting of the frequency of access and the time of access by an information user for each option on each menu and a priority for isolating for example, those options which have a high access frequency. This helps to improve operability.

The invention of JP-A-10-111876 assesses a referencing user according to assessment standards based on the results of the referencing operations of that user. Assessment standards are used in case of referencing a patent, to assess points that include the importance and the novelty of as well as the means pertaining to, that patent. Such assessments can be applied to an individual or a group and enable a subsequent referencing user to assess the results of referencing operations.

The invention of JP-A-11-39320 has a method for searching for related documents. This method records a "job name" and a "job handler" associated with the making of a document and times at which it is referenced, and automatically records a history of operations performed on that document including such things as the performance of, references and alterations to, the document. By doing this, links are created between the document and each "job name" and "job handler." Usage of these links enables a user to successively extract documents related to a particular document so the user can reference a document worked on for a job, to reference other jobs worked on for that referenced document and further, to reference documents worked on for that other jobs.

SUMMARY OF THE INVENTION

The conventional art as described has problems however. To shorten the time required for referencing for each individual user and to improve operability, the invention of JP-A-3-22084 does not allow sharing of history information by multiple people. In the invention of JP-A-10-111876 if an assessment is conducted by an individual, the system applies the assessment without regard to the level of skill of the person performing the assessment. This means that if there are differing points of focus for a referencing operation the assessment applied to a particular document may differ between different people. With technology of the conventional art as described, an assessment is applied to the actual target document itself but any relation that document has to an original document that would provide a good starting point to reference other related documents, is not revealed.

The invention of JP-A-11-39320 is a system which only associates a job and a document, however this is an inadequate degree of association for document referencing purposes. Creating an association between a job and a document in the case of for example the job of "creating a report" involves collecting data to produce the document, allowing the person concerned to reference other reports they produced themselves in the past and referencing documents for citation. It is therefore necessary for the various work objectives required for the job involved to be managed as linked attribute information. There is also the problem of cases in which links are formed to all documents that are worked on many of which have actually no relationship to a job. This leads for example to situations where certain documents are referenced in relation to a certain job that have no relationship to that job. The existence of such meaningless links complicates the work of referencing documents that are related to each other.

The problems with methodology used for referencing related documents using the prior art as described above is that the links between related documents all appear the same to everybody. To achieve a more effective and flexible document referencing methodology requires that the display of links be restricted according to conditions such as the objective of the referencing user's referencing operation, the group to which referencing a user belongs and the existence of access levels to links.

An objective of the present invention is to control the display of links between related documents to reflect the wishes of a referencing user and a link setting user.

To fulfill the above objective in the present invention restricts the display of links so as to coordinate them with the settings—the input—applied by the link setting user and to allow the referencing user to control the display of links based on information about the link setting user who input the link.

BRIEF DESCRIPTION OF THE DRAWINGS

FIG. 2 shows a document index table.

FIG. 3 shows a link information table.

FIG. 4 shows a user information table.

FIG. 5 shows an expertise table.

DESCRIPTION OF THE EMBODIMENTS

Figure 1:
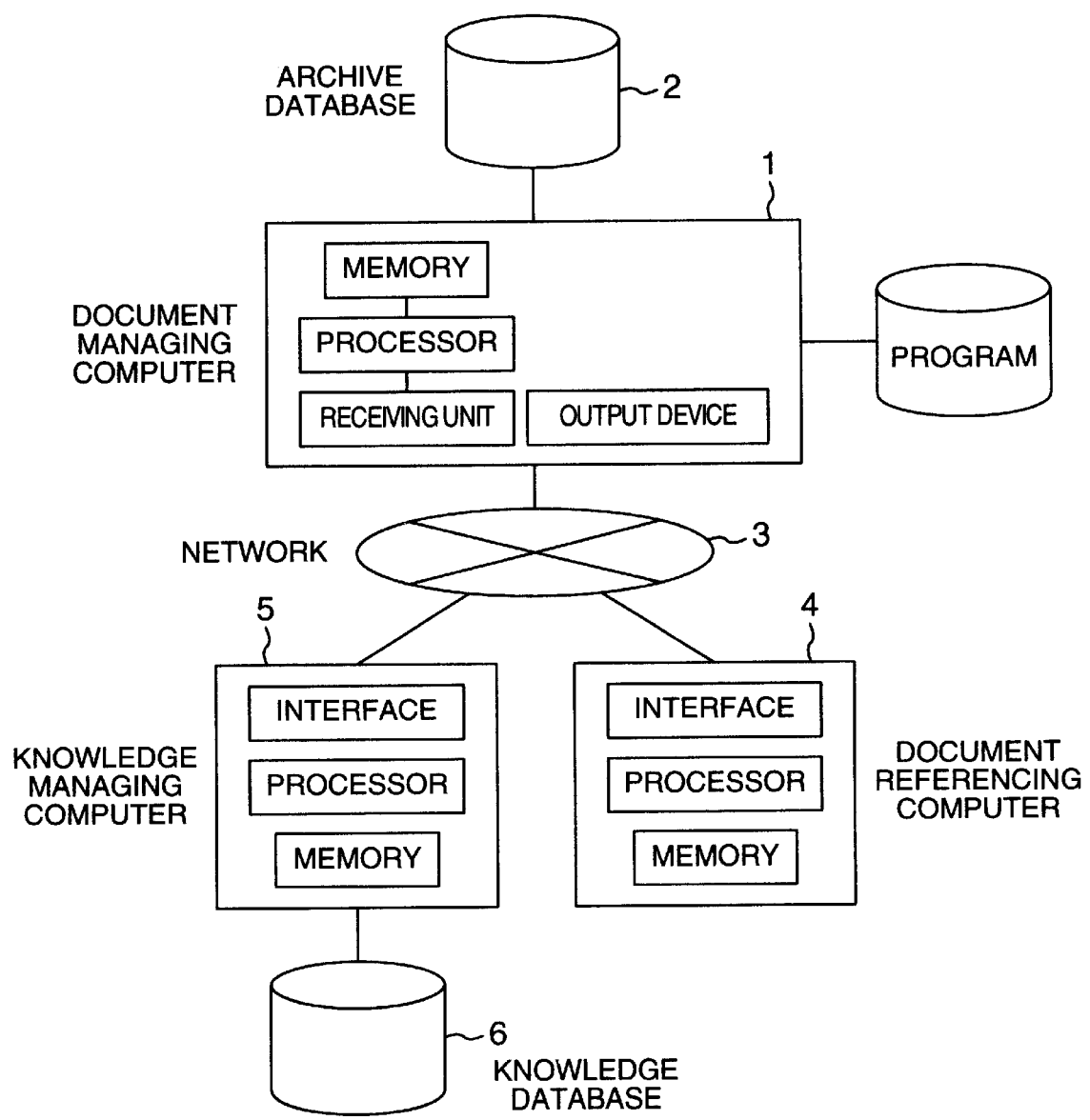
FIG. 1 shows the system structure according to an embodiment of the present invention.

A specific embodiment of an information referencing system according to the present invention will now be described with reference to FIGS. 1 through 11. The first description is of the overall structure of an information referencing system according to this embodiment.

A document managing computer 1 is a computer for managing documents to which is connected an archive database 2. The processings of data will be executed by the processor in the document managing computer and data can be transmitted in and out through the receiving unit and the output device based on the program in the memory. The document managing computer 1 and the archive database 2 are connected via a network and each may exist in separate locations. Documents for reference are stored in the archive database 2. A document referencing computer 4 transmits to the document managing computer 1 and a knowledge managing computer 5 through a network 3 and applies settings for document referencing and establishing relationships for a document. A knowledge database 6 is connected to the knowledge managing computer 5. The knowledge database 6 manages information on links between documents. The network 3 is a transmission medium for transmitting information and data, embracing transmission by the Internet, intranet or a local area network. The processings will be executed by the processors in the knowledge managing and the document referencing computers and data can be transmitted in and out through the interfaces.

It is possible for the document referencing computer 4 and the knowledge managing computer 5, the knowledge managing computer 5 and the document managing computer 1, the document referencing computer 4 and the document managing computer 1, the document referencing computer 4 and the knowledge managing computer 5 as well as the document managing computer 1, to be structured as an integrated whole. Whereas the following description envisages a configuration in which these three computers exist separately from each other as in FIG. 1, the description would still largely apply were these three computers to be each a single part or concentrated together.

The archive database 2 includes, as shown in FIG. 2, a document index table 20 and the document itself. Each document is identified by a document ID and is associated to each item in the document index table. At the very least the identifying document ID of a document must exist in the document index table and each ID should correspond to its respective document.

Figures 6, 7:
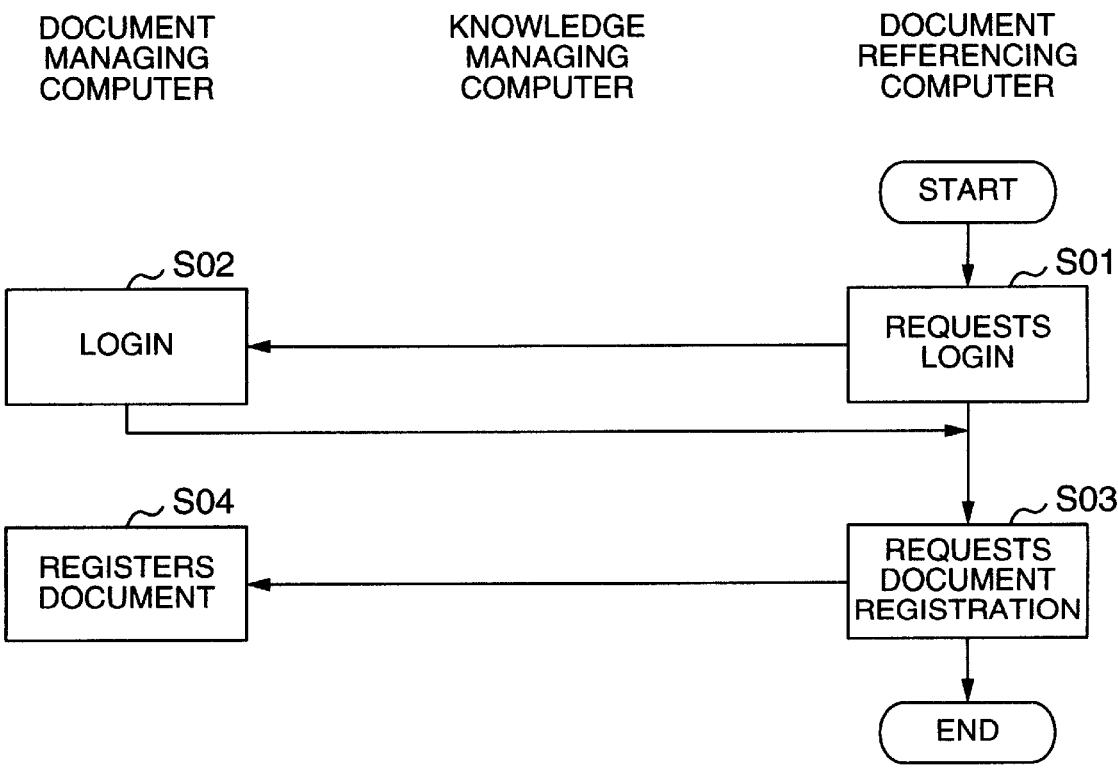
FIG. 6 shows a link source document ID table.
FIG. 7 shows the flow of processing operations that occur when a document is registered.

The knowledge database 6 of the form of this embodiment includes a link information table 30 shown in FIG. 3, a user information table 40 shown in FIG. 4, an expertise table 50 shown in FIG. 5 and a link source document ID table 60 shown in FIG. 6.

Certain settings must be applied before document referencing can commence.

User information defining users of the system is defined first. FIG. 4 shows the user information table 40. User information is information about a user who registers a document, references or sets links between documents.

Items in user information are a user ID, the user's name, the group to which he belongs and his access level. The user ID is the identifier which specifies a user in the system. The user's name is the user's real name. The user's group is the name of the group to which the user belongs e.g. a group such as the name of a department in an organization. Access level is a label that shows the scope of access that user has to a document or links between documents. 1 is the lowest level and the scope of access increases as the number of the level rises to 2 or 3.

FIG. 4 shows an example of user information. The user ID of this user is Tanaka, his user name is Ichiro Tanaka, his user group is Gr 1 and his access level is 1.

Next, expertise information is defined. FIG. 5 shows an expertise table 50. Expertise information is information that shows what expertise is held by which user.

FIG. 5 shows an example of expertise information. User Tanaka's expertise is in databases. It is possible to register multiple fields of expertise for one user. No registration is made for a user with no expertise.

The workings of the document referencing computer 4, the document managing computer 1 and the knowledge managing computer 5 when a user uses the document referencing computer 4 to reference a document in the archive database 2 will now be described. The conditions extant in each table are as shown in FIGS. 4 and 5.

The flow of processing operations when a document is registered, when a link is set between documents and when a document is referenced using a link will be described with reference to FIGS. 7 through 10. Firstly, the flow of operations for registering a document will be described with reference to FIG. 7.

(S01) In response to input from a user a message requesting login is sent from the document referencing computer 4 to the document managing computer 1. User ID=Tanaka for example is included in the message. A password may also be included.

(S02) In response to the user login request the document managing computer 1 looks up the user information table 40 and confirms that there is a record saying that that user ID is Tanaka and a login authorization message is delivered to the document referencing computer. If the login request message includes a password, although not illustrated in the drawings, the login password must be registered in advance in the user information table 40. Login authorization is based on the matching of a user ID and password.

(S03) The document referencing computer 4 sends a message requesting registration of a document to the document managing computer 1. This message could include for example document data, the document ID, the document name, a user ID, a user group and keywords. Document data includes at least one of text data, document data created by the application software used to create document, drawing data, image data, audio data and moving image data. The document ID is an identifier allocated to uniquely determine a document inside the system. The user ID and document user group are information about the user who registered the document. The user ID identifies the user. The user group identifies the group to which that user belongs. Keywords are words applied to assist in referencing the document.

(S04) The document managing computer 1 holds the document data included in the document registration request received in the archive database 2 and the information about the document is held in the document index table 20. FIG. 2 shows a document index table 20. The document index table holds this information so that information concerning the document stored in the archive database 2 can be referenced subsequently. FIG. 2 shows that the user Tanaka registered a document with the document name "x report" on Apr. 15th, 2000. FIG. 2 also shows that the document ID for the document is DOC 001, that the user group of Tanaka is Gr 1 and that reference keywords for this document are A and B.

A system design in which this document ID is automatically allocated from the document managing computer 1 would work well. In this case the numbers could conform to the order of registration. Having information concerning the document such as the document name, user ID and user group automatically registered as keywords may also be appropriate. An appropriate word from automatic analysis of data included in the document could also be registered.

This completes the description of the flow chart in FIG. 7. Here follows a description with reference to FIG. 8 of the flow of processing operations when a link between documents is established.

(S11) and (S12) are processes concerned with a user logging into the knowledge management computer 5 but further explanation has been omitted because they simply follow the processes of (S01) and (S02) respectively in respect of the document managing computer 1 except that the knowledge managing computer 5 should be read in place of the document managing computer 1.

(S13) The document referencing computer 4 delivers the document reference request message to the document managing computer 1. This message could for example be structured of referencing conditions including the document ID, document name, document creation date, user ID, user group and keywords.

(S14) The document managing computer 1 searches in the document index table 20 for documents that match the referencing conditions included in the document reference request message received and returns a document information list to the document referencing computer 4. The document information is constructed of the document ID, document name, document creation date, creating user ID and user group for example.

(S15) The document referencing computer 4 selects one document from the document information list received and delivers a message to the document managing computer 1 requesting that the data in the document be displayed. This message contains the document ID for example.

(S16) The document managing computer 1 pulls the document data specified in the document display request message out from the archive database 2 and delivers that document data to the document referencing computer 4.

(S17) The document referencing computer 4 displays the document data received. Next, if the user wants to set links between this document and another document a message requesting that this document be a link source document is delivered to the knowledge managing computer 5. This message could include for example the document ID and user ID. The link source document is one document amongst documents between which links are set. These processes may be performed after one document is selected from amongst multiple documents at (S13), dispensing with (S15) and (S16)

(S18) The knowledge managing computer 5 holds the document ID and user ID included in the link source specification request message received in the link source document ID table 60. If data from the same user ID already exists there that data is overwritten. FIG. 6 shows a link source document ID table 60. FIG. 6 shows that a user Tanaka has specified document DOC 001 as a link source document.

From (S19) to (S22) the user references another document and displays it. The processes involved here are each the same as those occurring between (S13) through (S16) and thus are not described here. The processes occurring between (S19) through (S22) may be repeated over again many times while (S17) may be executed at some stage within that sequence, in other words, link source documents may be reset multiple times.

(S23) The document referencing computer 4 specifies a particular document and delivers to the knowledge managing computer 5, a message requesting a linkage to a previously registered link source document. Items contained in this message include for example the document ID, the user ID of the user, the user's group of the user, the job, the objective, comments, access enabled groups, and access levels. The job shows information describing what work the document referencing operation the user is presently executing is part of. This could be for example creating a report or producing specifications. The objective shows the kind of objective that the links between the documents were set based on. When the job is creating a report for example, the objective will differ according to each operation comprising that job. This could include for example researching prior art, researching past reports of a similar type, researching trends in other companies, research about a specific technology, researching relevant laws or researching relevant drawings. The link setting user specifies what meaning the link he is about to set will have based on the setting for the objective. Comments are information that provides a supplementary explanation for the link and can be freely recorded at the discretion of the user. Access enabled groups are specified to control the users who are enabled access to the display of the links. At least one group must be specified for the user group of the user. To allow display to everybody, specify nothing. Access levels also are specified to control users who are enabled access to the display of links. Access levels specified in the users information table 40 are specified at this point.

(S24) The knowledge management computer 5 uses the user ID included in the set link request message received to acquire a link source document ID from the link source document ID table 60, which is stored in the link information table 30 together with other information included in the set link request message. FIG. 3 shows a link information table 30. The link information table 30 stores information about relationships between documents and relationship disclosure standards.

The relationships between documents shows for what purpose the relationship was set and by whom. The relationship disclosure standards show the scope of users to whom the relationship may be disclosed. The link source document ID and link recipient document ID of link information table 30 show the respective sides to the document linkage relationship. The link set date carries a value allocated automatically on the date the link is set. The user ID and user group of the user who set the link are information concerning the link setting user. The job, objective, comments, access enabled groups, and access levels are set in the set link request message. The reference frequency is set at 0 when the link is set. FIG. 3 shows a link set between documents, one with the document ID "DOC001" and the other "DR002." The link set date in that table is Jun. 5th, 2000 and the link setting user was "Tanaka," whose group is "Gr 1." The job at the time the link was set was "create report" and the objective was "research prior art." A comment about the link is "a picture of market information." Access enabled levels include "Gr 1" and "Gr 2" while the access level is "1."

Figure 8:
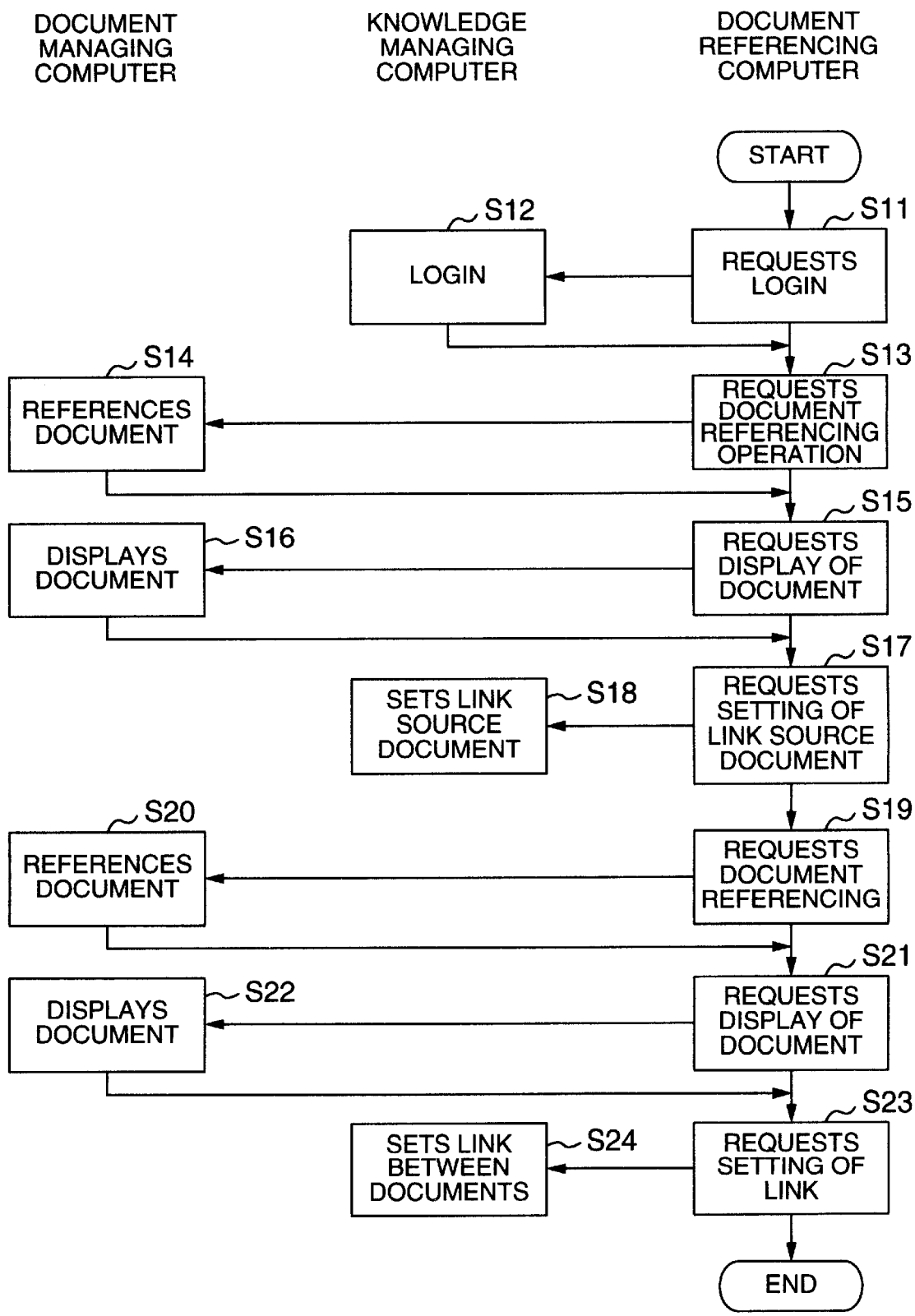
FIG. 8 shows the flow of processing operations that occur when a link is set.

This completes a description of the flowchart appearing in FIG. 8. Here follows a description with reference to FIG. 9, of the flow of processing operations when a document is referenced using a link.

(S30) and (S31) are processes involved when a user logs in, however no description is provided here because they are the same processes as (S11) and (S12) respectively.

(S32) through (S35) are the steps involved when a document is referenced in relation to input from a user and displayed. Because these steps involve the same processes as (S13) through (S16) respectively no description is provided of them here.

(S36) The document referencing computer 4 specifies a particular document and sends to the knowledge managing computer 5, a message requesting display of a list of links for other documents related to that document. This message includes information concerning the user and referencing conditions for the link.

(S37) The knowledge managing computer 5 returns to the document referencing computer 4, a list of information on links that match the link referencing conditions included in the display link list request message.

(S38) The document referencing computer 5 pulls the document data specified in the display document request message out from the archive database 2 and delivers this to the document referencing computer 4.

Figure 9:
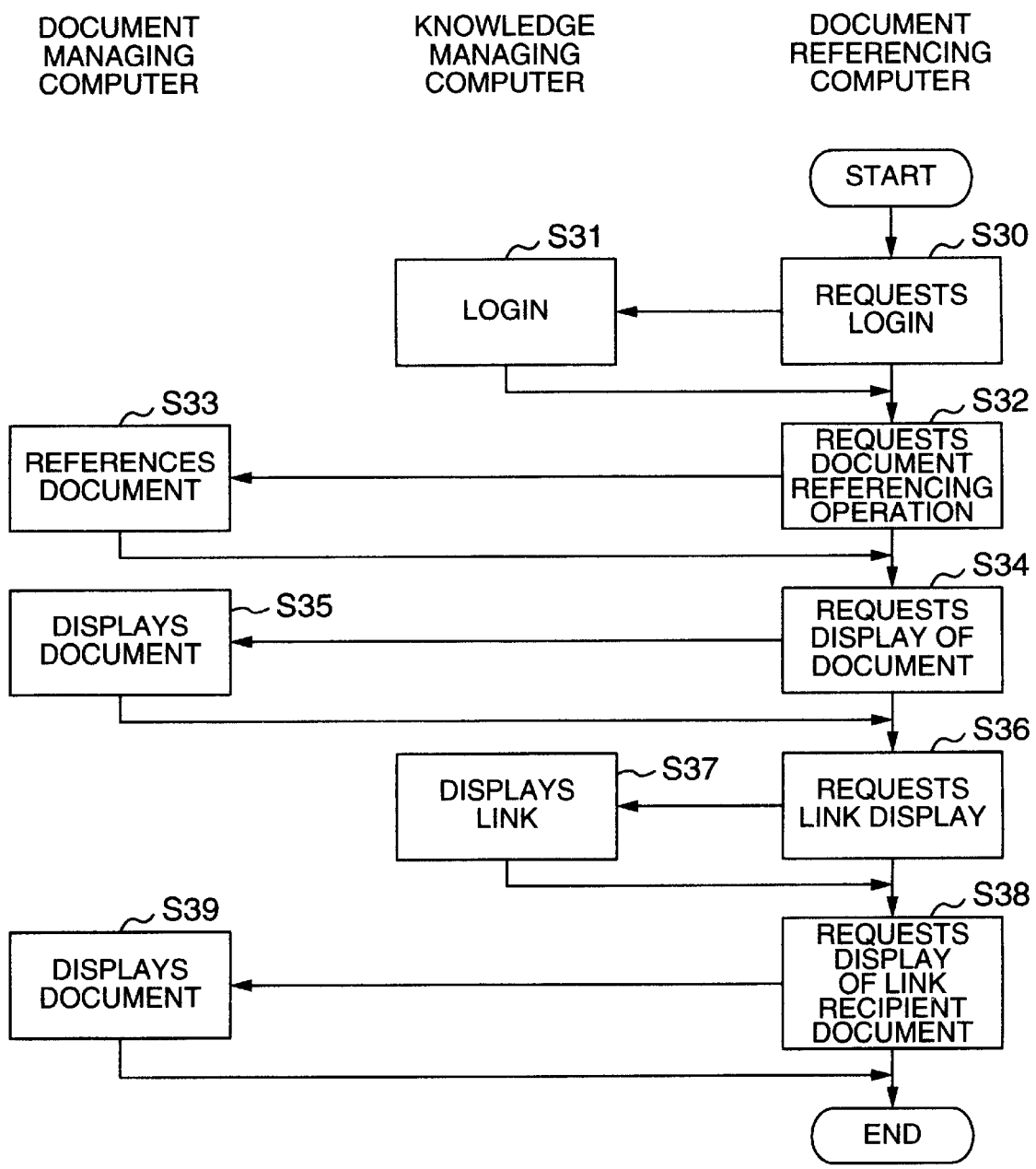
FIG. 9 shows the flow of operations that occurs when a document is referenced using a link.
Figure 10:
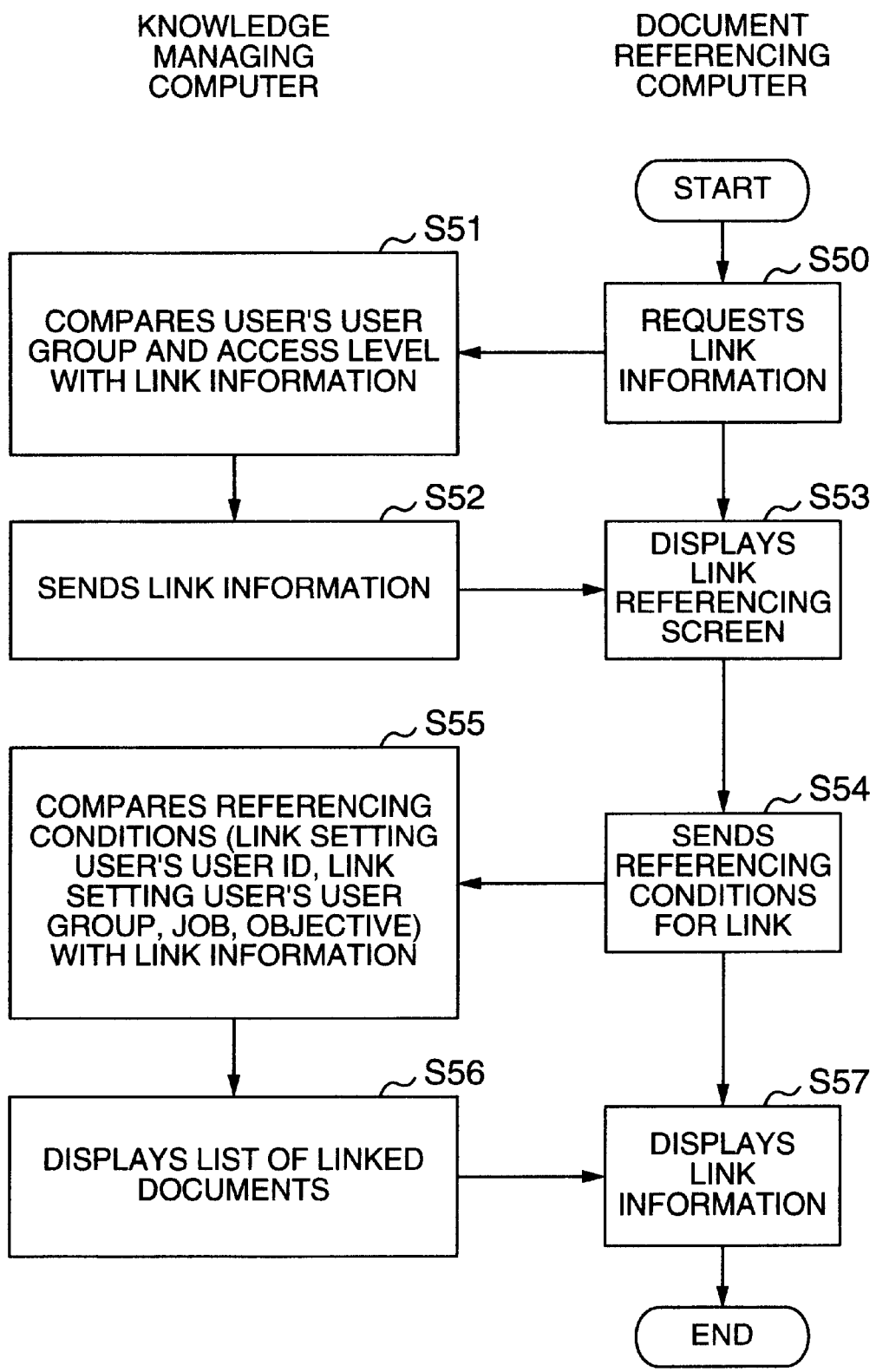
FIG. 10 shows in detail, the flow of operations that occur when a link is displayed.

This completes a description of the flowchart appearing in FIG. 9. Here follows a description, with reference to FIG. 10, of the detailed flow of processes in (S36) and (S37) concerned with the display of link information. (S36) and (S37) are constructed in detail through the exchange of messages two times.

(S50) The document referencing computer 4 specifies a particular document and delivers to the knowledge managing computer 5, a message requesting information on links to documents related to that document. The user ID and document ID are included in this message.

(S51) The knowledge managing computer 5 utilizes the user ID included in this request link information message to acquire from the user information table 40, the user group and access level of the user who originally created the document. Next, the system acquires for the link source document ID of the link information table 30, an equivalent record to the document ID included in the message. From among these records the system selects only the user of the user group and access level that fulfill the conditions for the requisite access enabled group and access levels. For example when "user ID" ="Tanaka" AND "document ID" ="DOC001" are included in the request link information message, the facts that the user group of the user Tanaka is "Gr 1" and the access level is "1" are known from the information recorded in the user information table 40. Next, the information for this link is selected because this user fulfills the conditions for the access enabled group and the access level for the document DOC001 as described in the link information table 30.

(S52) The knowledge managing computer 5 delivers to the document referencing computer 4, the link selected, information on the name of the user that corresponds to the user ID and an expertise list from the expertise table 50. If there is no such link information the system returns "no link."

Figure 11:
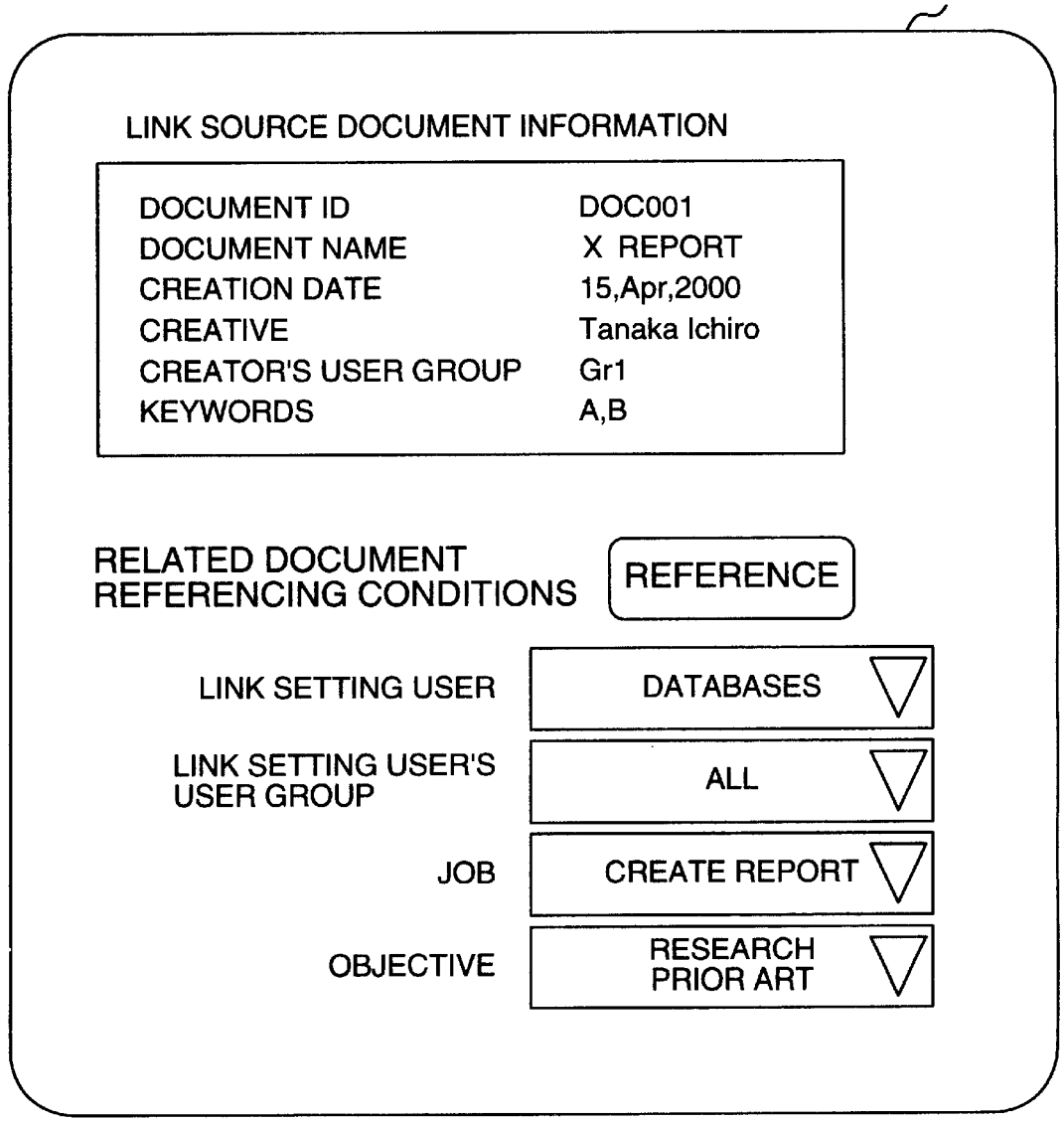
FIG. 11 shows an example of a link referencing screen.

(S53) Based on the information thus received the document referencing computer 4 creates a referencing screen which is displayed to the user. In this referencing screen the user is prompted to input referencing conditions for working in a link. FIG. 11 shows an example of a referencing screen.

(S54) The user inputs the referencing conditions for the link and the document referencing computer 4 sends these referencing conditions to the knowledge managing computer 5. The referencing conditions concerned are the link set date, the link setting user, the user group of the link setting user, the job, objective, comments and reference frequency. At this time, in addition to the name of the link setting user, the link setting user may include as optional items, his field of expertise as databases or networks. This means that if a subsequent user wishes only to see links set by a database expert that user can select "databases" for the link setting user. In the referencing screen 70 of FIG. 11 the referencing conditions set include "databases" set for the link setting user, the user group of the link setting user is not required, the job involved was "create report", and the objective was "research prior art."

(S55) The knowledge managing computer 5 performs a comparison between the referencing conditions received and the link information table 30 and acquires the appropriate link information.

(S56) The knowledge managing computer 5 sends to the document referencing computer 4 the link information thus acquired and information on the name of the user corresponding to the appropriate user ID.

(S57) The document referencing computer 4 displays the link information thus received. This completes a description of the flow chart of FIG. 10.

According to the configuration of the present invention, when the relationships between documents are established in a document referencing system, a variety of conditions may be used to control the display of relationships as manipulated by the user who sets the relationships and a referencing user.

What is claimed is:

1. A document management system for accessing documents in response to a referencing request from a document referencing system connected to the document management system via a network, said document management system comprising:

a storing device for storing a plurality of documents and relationship information comprising information defining relationships between the plurality of documents and disclosure standards regarding the defined relationships;

a receiving unit for receiving identifying information that identifies a first document of the plurality of documents sent from the document referencing system, a request to access documents with an appropriate relationship to said first document, and referencing conditions used for finding out or searching for the appropriate relationship;

a processor, coupled to said receiving unit and to said storing device, responsive to said request to access documents with the appropriate relationship to the first document, for selecting a relationship from the relationship information as the appropriate relationship to the first document based on said referencing conditions, conducting a search of the documents and selecting a document that fulfills said selected appropriate relationship to the first document wherein:

said selected appropriate relationship is a link between different documents; and said referencing conditions include information showing whether the link is established in accordance with predetermined conditions; and an output device, coupled to said processor and to said network, that sends the selected document to the document referencing system via the network.

2. A document management system for accessing documents in response to a referencing request from a document referencing system connected to the document management system via a network, said document management system comprising:

a storing device for storing a plurality of documents and relationship information comprising information defining relationships between the plurality of documents and disclosure standards regarding the defined relationships;

a receiving unit for receiving identifying information that identifies a first document of the plurality of documents sent from the document referencing system, a request to access documents with an appropriate relationship to said first document, and referencing conditions used for finding out or searching for the appropriate relationship;

a processor, coupled to said receiving unit and to said storing device, responsive to said request to access documents with the appropriate relationship to the first document, for selecting a relationship from the relationship information as the appropriate relationship to the first document based on said referencing conditions, conducting a search of the documents and selecting a document that fulfills said selected appropriate relationship to the first document; and an output device, coupled to said processor and to said network, that sends the selected document to the document referencing system via the network.

3. A document management system according to claim 2, wherein said disclosure standards are defined according to a user initiating the request or said document referencing system.

4. A document management system according to claim 3, wherein said referencing conditions include information relating to the user who initiates the request or information identifying the document referencing system.

5. A document management system according to claim 4, wherein the information relating to said user who initiated the request includes information identifying said user who initiated the request or information identifying an organization to which said user who initiated the request belongs.

6. A document management system according to claim 2, wherein:

said network is connected to a knowledge management system that stores information defining the appropriate relationship;

said receiving unit receives said information defining the appropriate relationship to said first document from said knowledge management system via said network; and said processor conducts the search and selects the document that fulfills the selected appropriate relationship based on said information defining the appropriate relationship received from the knowledge management system.

7. A document management system according to claim 2, wherein said referencing conditions include one or more conditions defined according to: information regarding a person who sets the relationship between the first document and the selected document, or information regarding a group to which the person belongs, or an objective regarding why the relationship was set between the first document and the selected document.

8. A document management system according to claim 2, wherein the selecting of a relationship by the processor is further based on the disclosure standards of the selected appropriate relationship.

9. A document management system according to claim 8, wherein the processor performs the selecting of a relationship by comparing the referencing conditions to the disclosure standards of the selected appropriate relationship.

10. A document management method for managing a plurality of documents comprising the steps of:

storing the plurality of documents and relationship information comprising information defining relationships between the plurality of documents and disclosure standards regarding the defined relationships;

receiving identifying information that identifies a first document of the plurality of documents;

receiving a request to access documents having an appropriate relationship to said first document;

receiving referencing conditions related to at least one attribute of the appropriate relationship to the first document;

selecting a relationship from the relationship information as the appropriate relationship with said first document in accordance with the referencing conditions related to the at least one attribute of the appropriate relationship to the first document wherein said selected appropriate relationship is a link between different documents, and wherein said referencing conditions include information showing whether the link is established in accordance with predetermined conditions; and selecting a document that fulfills the selected appropriate relationship.

11. A document management method for managing a plurality of documents comprising the steps of:

storing the plurality of documents and relationship information comprising information defining relationships between the plurality of documents and disclosure standards regarding the defined relationships;

receiving identifying information that identifies a first document of the plurality of documents;

receiving a request to access documents having an appropriate relationship to said first document;

receiving referencing conditions related to at least one attribute of the appropriate relationship to the first document;

selecting a relationship from the relationship information as the appropriate relationship with said first document in accordance with the referencing conditions related to the at least one attribute of the appropriate relationship to the first document; and selecting a document that fulfills the selected appropriate relationship.

12. A document management method according to claim 11 wherein the plurality of documents are stored in a storage means.

13. A document management method according to claim 12, wherein said disclosure standards are defined according to a user who initiated the request or a document referencing system used to initiate the request.

14. A document management method according to claim 13, wherein said referencing conditions include information identifying the user who initiated the request or information identifying the document referencing system used to initiate the request.

15. A document management method according to claim 14, wherein the disclosure standards are applied to either the information identifying said user who initiated the request or information identifying an organization to which said user who initiated the request belongs.

16. A document management method according to claim 11, wherein information identifying the appropriate relationship is obtained from a knowledge management system via a network; and wherein the step of selecting a relationship is performed based on the information identifying the appropriate relationship stored in said knowledge management system.

17. A document management method according to claim 11, wherein the selecting of a relationship is further based on the disclosure standards of the selected appropriate relationship.

18. A document management method according to claim 17, wherein the step of selecting of a relationship comprises comparing the referencing conditions to the disclosure standards of the selected appropriate relationship.

19. A program loadable in a storage medium from which a computer can retrieve data, wherein the program, upon execution by the computer, controls the computer to perform the steps of:

storing a plurality of documents and relationship information comprising information defining relationships between the plurality of documents and information of disclosure standards regarding the defined relationships;

receiving from a document referencing system via a network identifying information that identifies a first document of the plurality of documents;

receiving a request to access documents having an appropriate relationship to said first document;

receiving referencing conditions related to at least one attribute of the appropriate relationship to the first document;

selecting a relationship from the relationship information as the appropriate relationship with said first document in accordance with the referencing conditions related to the at least one attribute of the appropriate relationship to the first document, wherein:

said selected appropriate relationship is a link between different documents; and said referencing conditions include information showing whether the link is established in accordance with predetermined conditions; and selecting a document that fulfills the selected appropriate relationship.

20. A program loadable in a storage medium from which a computer can retrieve data, wherein the program, upon execution by the computer, controls the computer to perform the steps of:

storing a plurality of documents and relationship information comprising information defining relationships between the plurality of documents and information of disclosure standards regarding the defined relationships;

receiving from a document referencing system via a network identifying information that identifies a first document of the plurality of documents;

receiving a request to access documents having an appropriate relationship to said first document;

receiving referencing conditions related to at least one attribute of the appropriate relationship to the first document;

selecting a relationship from the relationship information as the appropriate relationship with said first document in accordance with the referencing conditions related to the at least one attribute of the appropriate relationship to the first document; and selecting a document that fulfills the selected appropriate relationship.

21. A program according to claim 20, wherein said disclosure standards are defined according to a user who initiated the request or said document referencing system.

22. A program according to claim 21, wherein said referencing conditions include information identifying the user or the document referencing system.

23. A program according to claim 21, wherein the disclosure standards are applied to either the information identifying said user that initiated the request or information identifying an organization to which said user who initiated the request belongs.

24. A program according to claim 21, wherein the selecting of a relationship is further based on the disclosure standards of the selected appropriate relationship.

25. A program according to claim 24, wherein the selecting of a relationship comprises comparing the referencing conditions to the disclosure standards of the selected appropriate relationship.

26. A program according to claim 20, wherein execution of the program further controls the computer to connect to a knowledge management system storing information identifying the appropriate relationship via a network.

* * * * *